(12) United States Patent
Sturiale

(10) Patent No.: US 6,922,211 B2
(45) Date of Patent: Jul. 26, 2005

(54) SCANNING AND CLEANING DEVICE FOR EXPLOSION-PROOF CASING FOR MONITORING APPARATUS SUCH AS SURVEILLANCE TELEVISION CAMERA OPERATING IN EXPLOSIVE ENVIRONMENT

(75) Inventor: Santi Sturiale, Cesano Boscone (IT)

(73) Assignee: Videotec S.r.l. (IT)

( * ) Notice: Subject to any disclaimer, the term of this patent is extended or adjusted under 35 U.S.C. 154(b) by 802 days.

(21) Appl. No.: 09/798,006

(22) Filed: Mar. 2, 2001

(65) Prior Publication Data

US 2001/0048471 A1 Dec. 6, 2001

Related U.S. Application Data

(60) Provisional application No. 60/187,578, filed on Mar. 7, 2000.

(51) Int. Cl.[7] .................................................. H04N 5/225
(52) U.S. Cl. .......................................... 348/373; 348/83
(58) Field of Search ............................... 348/82, 83, 373

(56) References Cited

U.S. PATENT DOCUMENTS

| | | | | |
|---|---|---|---|---|
| 3,718,758 A | * | 2/1973 | Ponghis et al. | 348/83 |
| 4,225,881 A | * | 9/1980 | Tovi | 348/374 |
| 5,054,725 A | | 10/1991 | Bucefari et al. | 248/123.1 |
| 5,089,895 A | * | 2/1992 | Fraker et al. | 348/373 |
| 5,214,245 A | * | 5/1993 | Bernhardt et al. | 348/373 |
| 5,617,762 A | * | 4/1997 | Kirsch | 348/373 |
| 5,818,519 A | | 10/1998 | Wren | 348/151 |
| 5,903,306 A | * | 5/1999 | Heckendorn et al. | 348/82 |
| 6,147,701 A | * | 11/2000 | Tamura et al. | 348/373 |
| 6,527,000 B1 | * | 3/2003 | Randmae et al. | 134/99.1 |
| 6,628,338 B1 | * | 9/2003 | Elberbaum et al. | 348/373 |
| 6,678,001 B1 | * | 1/2004 | Elberbaum | 348/373 |

FOREIGN PATENT DOCUMENTS

| | | | |
|---|---|---|---|
| DE | 29616586 U | 3/1997 | |
| EP | 0 415 891 A2 | 3/1991 | |
| EP | 0 415 891 A3 | 3/1991 | |
| EP | 0 991 040 A3 | 4/2000 | |
| EP | 0 991 040 A2 | 4/2000 | |
| JP | 05048939 A * | 2/1993 | H04N/5/225 |
| JP | 07152093 A * | 6/1995 | H04N/5/225 |
| JP | 09080606 A * | 3/1997 | G03B/17/02 |
| JP | 10191120 A * | 7/1998 | H04N/5/225 |
| JP | 2000175090 A * | 6/2000 | H04N/5/225 |

* cited by examiner

Primary Examiner—Wendy R. Garber
Assistant Examiner—Jason Whipkey
(74) Attorney, Agent, or Firm—Woodcock Washburn LLP

(57) ABSTRACT

An scanning device for a television camera sealed in a casing. An intermediate body is rotatable on a support about a first rotation axis. The camera is rotatable on the intermediate body about a second rotation axis by rotatable coupling mechanisms provided with respective internal housing seals within which are introduced and disposed along a rotation axis successive respective deformable sections of connection cable for the camera, pre-shaped partially wound in a helix with respective axis parallel to the rotation axis to be elastically deformable to unwind from the helical shape under camera rotation. The casing has a transparent element facing the camera lens and a cleaning device therefor including a transparent film and a movement mechanism to move the film across the transparent element as needed.

14 Claims, 5 Drawing Sheets

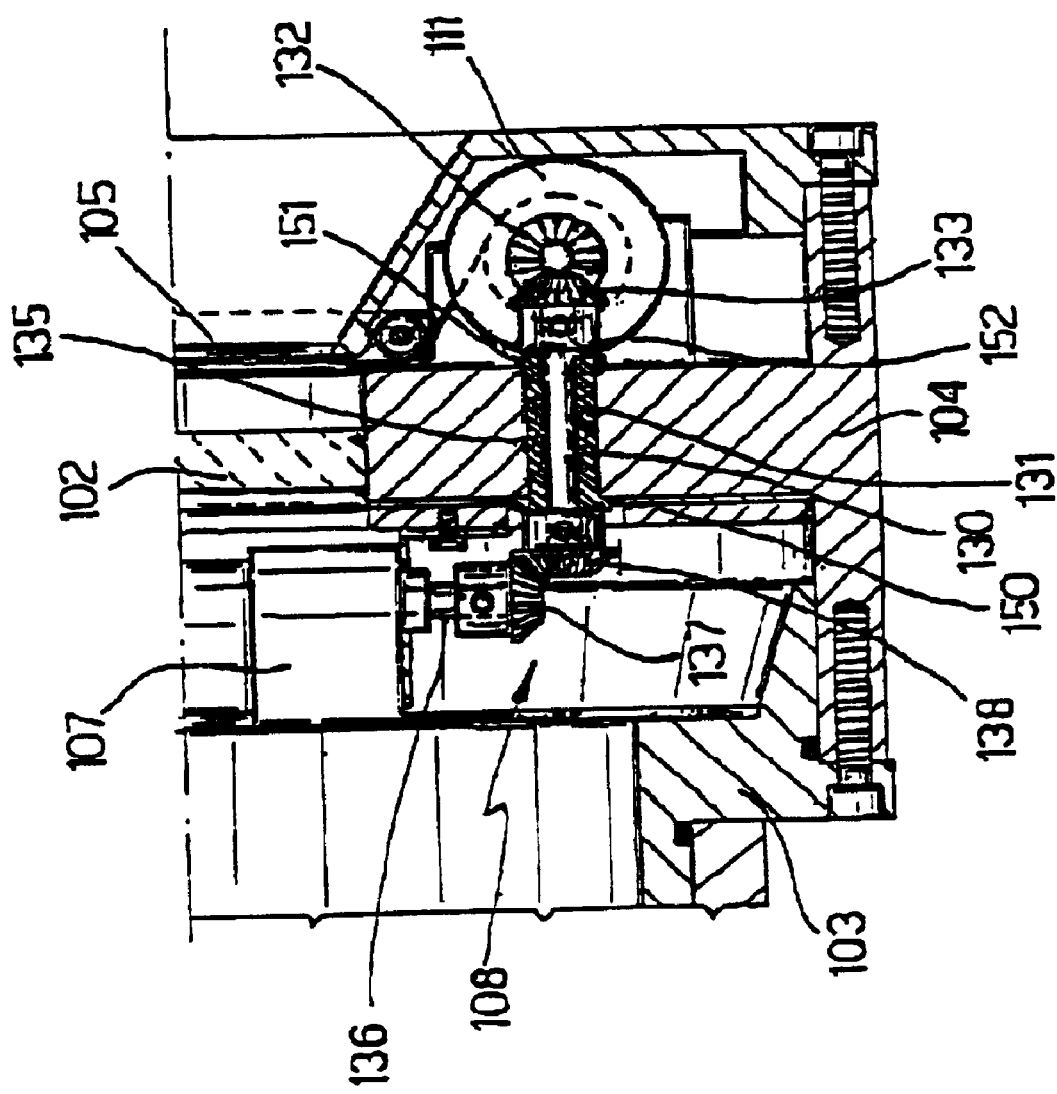

SCANNING AND CLEANING DEVICE FOR EXPLOSION-PROOF CASING FOR MONITORING APPARATUS SUCH AS SURVEILLANCE TELEVISION CAMERA OPERATING IN EXPLOSIVE ENVIRONMENT

CROSS-REFERENCE TO RELATED APPLICATION

The present application claims the benefit of U.S. Provisional Application No. 60/187,578, filed Mar. 7, 2000, hereby incorporated by reference in its entirety. The present application is also related to European Application No. 99117282.6 filed Sep. 2, 1999 hereby incorporated by reference in its entirety, and Italian Applications Nos. MI981968 and MI980592U, both filed Sep. 4, 1998 and both hereby incorporated by reference in their entirety.

FIELD OF THE INVENTION

The present invention relates to an explosion-proof scanning device for a monitoring apparatus, and in particular for a surveillance television camera operating in an industrial environment in the presence of explosive gases. The present invention further relates to a cleaning device for a window of an explosion-proof casing in which the television camera is enclosed.

BACKGROUND OF THE INVENTION

The surveillance of industrial environments in which explosive gases are present requires the use of television cameras or other monitoring apparatus with particular explosion proofing constructional characteristics which both ensure the operation thereof even in the case of explosion and avoid the risk that the apparatus itself will trigger an explosion in the environment such as for example by creating sparks. Clearly, in the most frequent cases, in which the use of movable monitoring apparatus is required (and in particular television cameras), which can be orientated to monitor different regions of the environment, the associated movement systems must also possess explosion-proof characteristics.

In particular, scanning devices for television cameras are known which allow displacement thereof in two planes (typically horizontal and vertical) with predetermined excursions. On a fixed support, for example secured to a wall bracket, there is rotatably mounted an intermediate unit to which, in turn, the body of the television camera is rotatably connected. Within the intermediate unit are housed the drive mechanism which allow rotation of the unit with respect to the support and rotation of the television camera with respect to the intermediate unit.

Clearly, scanning devices of this type require the presence of connection cables between the various movable components, which cables also serve to supply the various components for control of the scanning and for control of the television camera. Known scanning devices have in general the main disadvantage that these cables are disposed outside of the device and hang between the different parts in relative motion. Consequently, not only are the cables exposed to the action of external agents (which may be aggressive, especially in some industrial environments), but, in the specific case of installations in an explosive environment, are also directly exposed to a possible explosion thereby constituting a point of weakness of the explosion-proof assembly.

On the other hand, housing the cables within the scanning device would, if known arrangements were used, require an unacceptable increase in the dimensions of the device itself and would in any event involve the further problem of avoiding twisting of the cables themselves during relative rotation of the different components of the device, with consequent wear and deterioration of the cables and possible compromise of the regular function of the television camera. Finally, these problems are aggravated by the fact that television cameras which operate in industrial environments in which explosive gases are present must be subject to safety rules which require that the television cameras themselves be sealed and isolated from the external environment within a sealed casing constructed in such a way that a possible explosion within the television camera cannot be transmitted to the external environment and vice versa.

Obviously, the sealed casing is provided with a transparent window disposed in front of the lens of the television camera, but, because of the particular environment in which these television cameras operate, the protective window becomes dirty very quickly. In order not to prejudice the efficiency of the television camera it is thus necessary to provide for frequent manual cleaning of the window itself by way of an operator who, therefore, has to work in an extremely dangerous environment.

The object of the present invention is that of overcoming the disadvantages of the known devices described by providing, in particular, an explosion-proof scanning device which is simple and economic to construct, extremely compact and of small dimensions, which can remain operational for a long time without deterioration and is suitable for use in an explosive environment, and which allows the television camera to be enclosed within a sealed casing.

Another object of the invention is to provide an automatic cleaning device for the window of a casing which maintains the efficiency of the television camera for a long time without requiring manual interventions, being at the same time simple and economic to produce and not detrimental to the explosion-proof characteristics of the assembly.

SUMMARY OF THE INVENTION

In accordance with the above objects, there is provided an explosion-proof scanning device for a monitoring apparatus, in particular for a television camera for surveying an explosive environment, comprising first and second bodies movable with respect to one another, first mechanism for rotatably coupling the said first and second bodies, first drive mechanism for relatively rotating one or the other of said first and second bodies about a first predetermined axis of rotation, and at least a first connection cable disposed for connection of the said first and second body. In the scanning device, the first rotatable coupling mechanism are provided with a first internal housing for the passage of the at least one connection cable, and the at least one connection cable is fitted within the first internal housing seat and passes substantially along the first axis of rotation.

In particular, the at least one first connection cable comprises a first deformable portion thereof, fitted in the first internal housing, and has a helical conformation with an axis substantially parallel to the first axis of rotation. The first deformable section is plastically deformable above a predetermined stress threshold to be pre-shaped in the helical conformation, is elastically deformable to unwind from the helical conformation under a predetermined load, less than the said predetermined stress threshold, and reassumes the helical conformation upon the release of the predetermined load.

Further, there is provided a cleaning device for a window of an explosion-proof casing, in particular a casing containing the above mentioned television camera.

In this way, the device according to the invention is free from external connection cables between the parts in relative motion. Consequently, the cables are in general protected against the action of external agents and in particular from the effects of a possible explosion. The proposed arrangement of the invention, as well as being safer in the case of explosion, further simplifies the operations of installation and maintenance of the device itself. The particular and innovative arrangement of cables within the scanning device further avoids wear and twisting of the cables themselves during relative rotation of the different components of the device.

Moreover, a television camera housed in an explosion-proof casing as above can be provided with the cleaning device according to the present invention while maintaining its efficiency for a long time notwithstanding the particular environment in which it operates, thereby allowing frequent manual intervention for maintenance to be avoided.

BRIEF DESCRIPTION OF THE DRAWINGS

The foregoing summary as well as the following detailed description of the present invention will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 5 is a view in section of a portion of the device of FIG. 4.

DETAILED DESCRIPTION OF PREFERRED EMBODIMENTS

Figure 1:
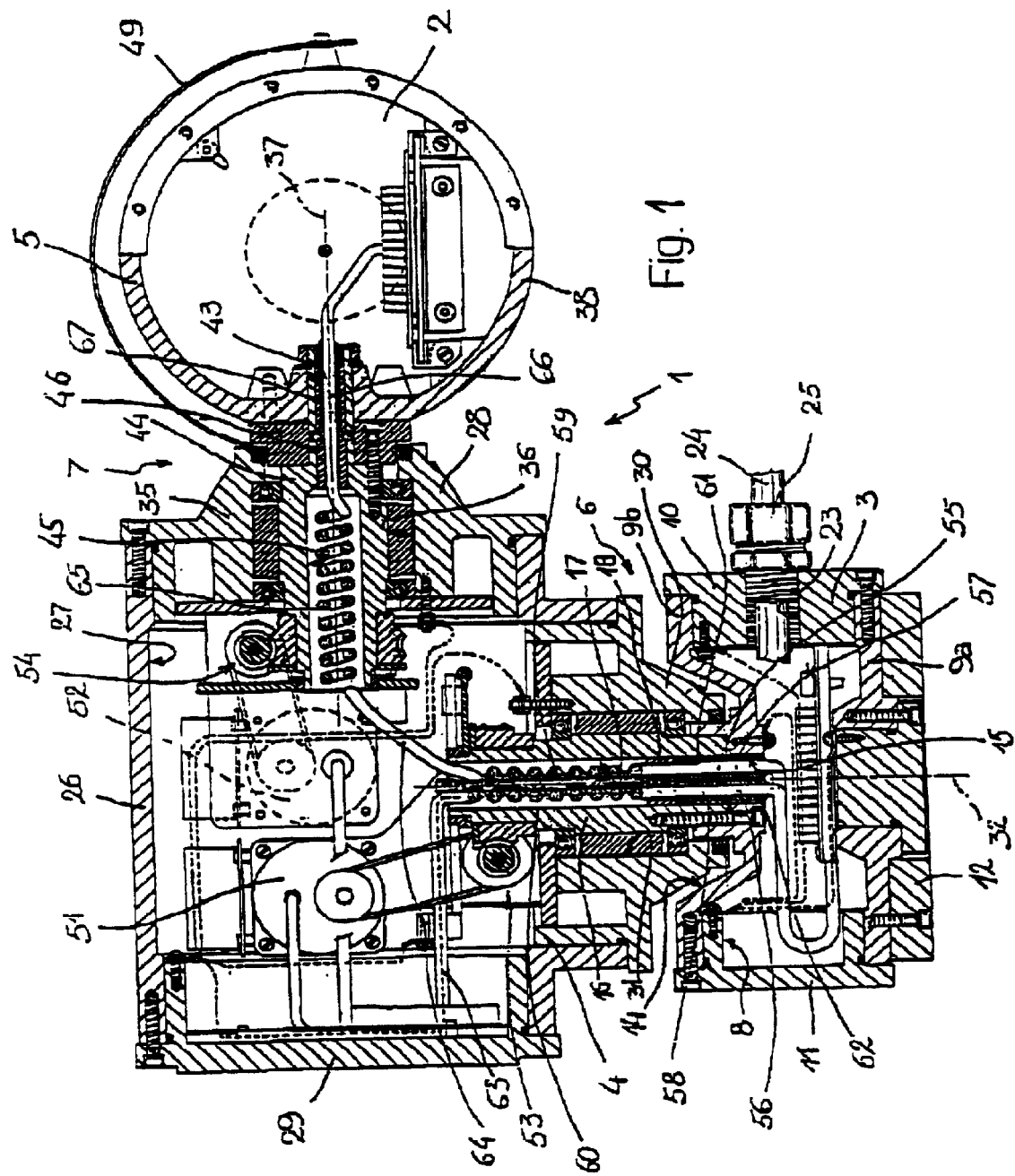
FIG. 1 is a sectioned frontal view of a scanning device according to the invention.

Certain terminology may be used in the following description for convenience only and is not considered to be limiting. For example, the words "left", "right", "upper", and "lower" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

Figure 2:
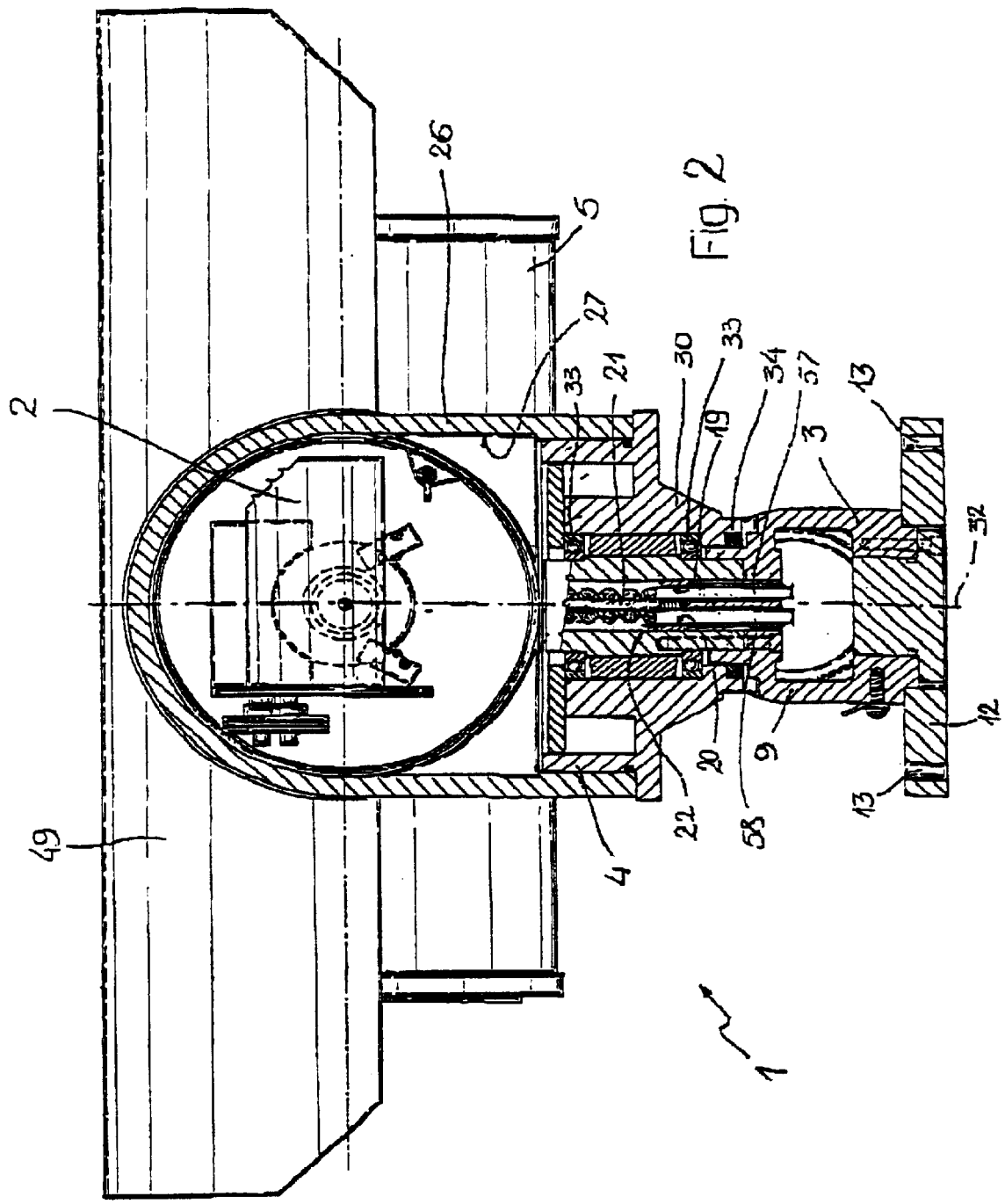
FIG. 2 is a partially sectioned side view of the device of FIG. 1.
Figure 3:
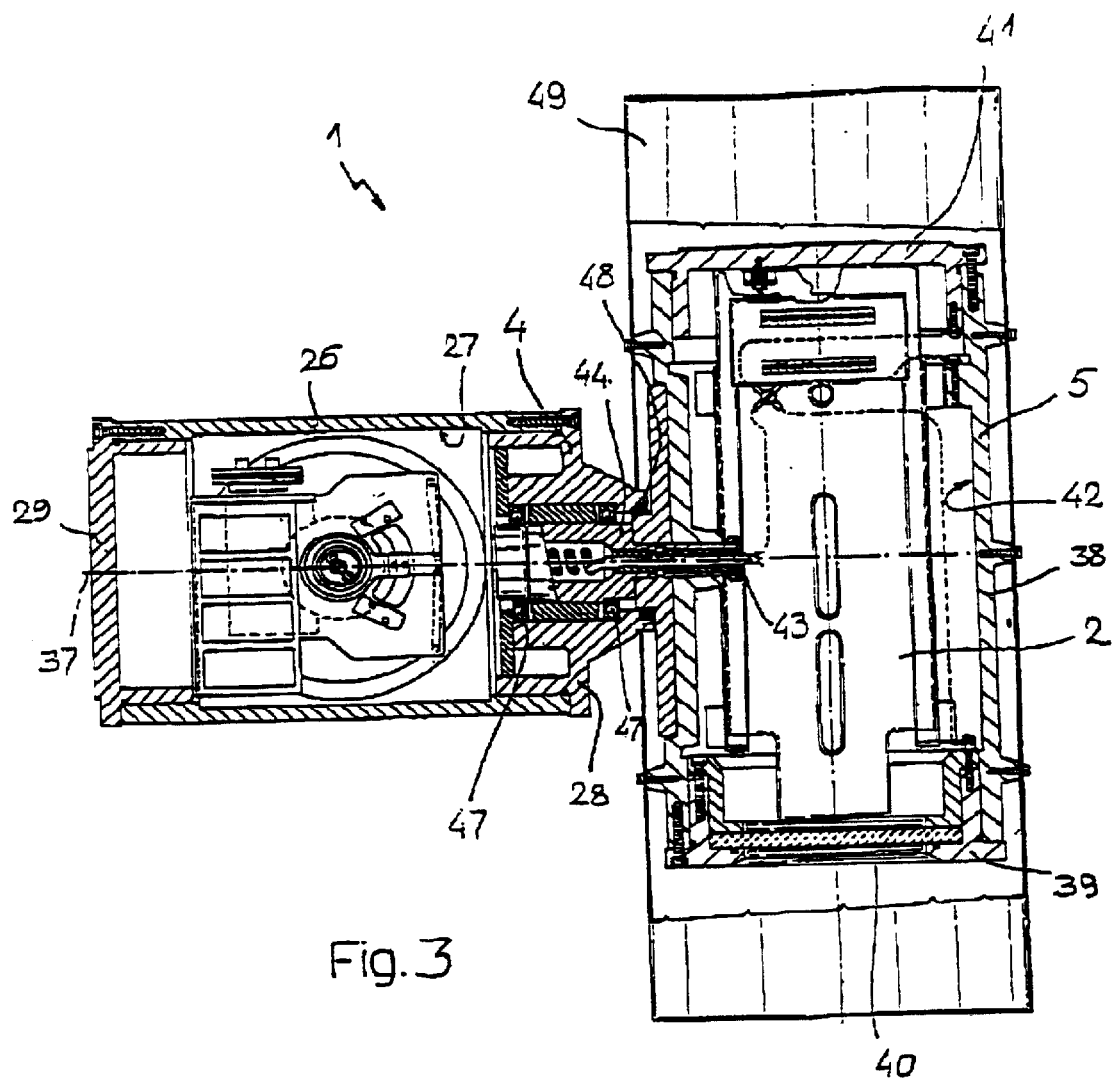
FIG. 3 is a partially sectioned plan view of the device of FIG. 1.

With reference to FIGS. 1 to 3, the reference numeral 1 generally indicates an explosion-proof scanning device for a monitoring apparatus 2, in the specific example a surveillance television camera installed in an environment in which explosive gases are present. The device 1 comprises a first body 3, constituted by a fixed support, a second body 4 movable with respect to the fixed support 3, and a third body 5 constituted by a protective casing within which the television camera 2 is housed so as to be in turn movable with respect to the body 4. The device 1 further includes a first rotatable coupling mechanism 6 for coupling the body 4 to the support 3 and a second rotatable coupling mechanism 7 for coupling the body 4 to the casing 5.

The support 3 can be shaped in any manner and formed according to any known constructional or arrangements in such a way as to resist internal and external explosions of a predetermined magnitude (so as to comply with the regulations for explosion-proof apparatus). In the non-limiting specific example illustrated in FIGS. 1 to 3 the support 3 is an internally hollow prismatic body provided with a hermetically closed interior cavity 8 de-limited by respective side walls 9 of the prismatic body 3 and closed, at respective opposite longitudinal ends, by two covers 10, 11. The support 3 is further provided with a base plate 12 fixed to a side wall 9a of the prismatic body constituting the support 3 and provided with a fixing mechanism 13 (for example through holes for associated screws) by way of which the support 3 can be secured, for example, to a wall bracket. At a side wall 9b of the prismatic body constituting the support 3, opposite and facing the side wall 9a and the base plate 12, a frusto-conical cavity 14 is defined, and at the center thereof is defined a circular aperture 14 passing through the side wall 9b and in communication with the interior cavity 8 of the support 3 itself.

The support 3 further includes a tubular element 16 which extends orthogonally and projects from the side wall 9b on the opposite side from the internal cavity 8, in correspondence with the circular aperture 15. The circular aperture 15 and the tubular element 16 define a substantially cylindrical internal housing 17. Within the internal housing 17, in correspondence with the first longitudinal end thereof, there is fitted a tubular sleeve 18 constituted in the specific example by a solid cylinder provided with and defining a pair of longitudinal through holes 19, 20 disposed diametrically opposite one another. A central pin 21 projects axially from a center of an axial end surface 22 of the solid cylinder which constitutes the tubular sleeve 18 and the longitudinal through holes 19, 20 are defined symmetrically with respect to this center and offset from the central pin 21.

The support 3 is provided with and defines a further hole 23 for access to its internal cavity 8, for example formed through the cover 10 of the support 3 itself (in the specific example substantially perpendicular to the base plate 12 and the side walls 9). Through the hole 23 passes an output cable 24, fixed to the cover 10 in a known manner (for example by way of a threaded connector 25).

The body 4 may have any shape and is formed, again according to substantially known constructional arrangements, in such a way as to resist internal and external explosions of a predetermined magnitude (so as to comply with regulations for explosion-proof apparatus). In the specific example shown, the body 4 comprises a substantially cylindrical internally hollow element 26 having an internal cavity 27 and closed at its respective opposite axial ends by two covers 28, 29 connected to the cylindrical element 26 in a known manner and hermetically sealed. The body 4 further includes a frusto-conical portion 30 projecting from an outer lateral surface of the cylindrical element 26 towards the support 3 and internally provided with a substantially cylindrical rotation seat 31, within which the tubular element of the support 3 can be inserted and forming part of first rotatable coupling mechanism 6 which is able to allow relative rotation of the body 4 with respect to the support 3 about an axis of rotation 32 substantially coincident with a longitudinal axis of symmetry of the tubular element 16 and therefore of the internal housing 17.

When the tubular element 16 is fitted into the associated rotation seat 31 the frusto-conical portion 30 of the body 4 is housed in the frusto-conical cavity 14 of the support 3. The first rotatable coupling mechanism 6 further includes a pair of bearings 33 of known type, for example rolling element bearings, radically interposed between an outer lateral surface of the tubular element 16 and an inner lateral surface of the rotation seat 31. The first rotatable coupling mechanism 6 further includes a seal mechanism 34, also substantially known, for ensuring the sealing coupling of the body 4 and the support 3, for example constituted by at least one sealing ring radically interposed between the tubular element 16 and the associated rotation seat 31.

In the non-limiting embodiment illustrated in FIGS. 1 to 3, the body 4 includes a further frusto-conical portion 35 projecting from an outer surface of the cover 28 on the side opposite the internal cavity 27, in the direction of the body 5. The portion 35 is substantially orthogonal to the other frusto-conical portion 30 of the body 4 and internally similar to it, in particular being provided with a rotation seat 36, also substantially cylindrical, forming part of the second rotatable coupling mechanism 7 of the body 4 and the body 5, which is able to allow relative rotation of this body 5 with respect to the body 4 about an axis of rotation 37 substantially orthogonal to the axis of rotation 32.

The body 5 is constituted by a casing, for example substantially cylindrical, comprising a side wall 38, a front wall 39 provided with a window 40 and a rear wall 41 opposite and facing the front wall 39. The casing 5 is also formed in a substantially known manner with explosion-proof characteristics, in particular as far as the connection of its side, front and real walls are concerned. In an internal cavity 42 of the casing 5 is housed the television camera 2 (substantially known and not described in detail for simplicity). The side wall 38 is provided, for example in its central region, with a substantially circular radial aperture 43 for communication with the internal cavity 42. From a peripheral edge of the aperture 43 projects, radially in the direction of the body 4 and therefore on the opposite side from the internal cavity 42, a tubular element 44 fixedly connected to the casing 5 in a known manner and substantially similar to the previously described tubular element 16. In particular, the tubular element 40, together with the aperture 43, also defines internally a substantially cylindrical inner housing 45 at one longitudinal end of which there is fitted a tubular sleeve 46, in the specific example constituted by an internally hollow cylinder.

The second rotatable coupling mechanism 7, as described with reference to the first rotatable coupling mechanism 6, also comprise a pair of known bearings 47, for example rolling element bearings, radially interposed between an outer lateral surface of the tubular element 44 and an inner lateral surface of the rotation seat 36, and a sealing mechanism 48, also known, for ensuring sealing coupling of the body 4 and the body 5, for example constituted by at least one sealing ring radially interposed between the tubular element 44 and the associated rotation seat 36. Preferably, moreover, the casing 5 is provided with a substantially known semi-cylindrical screen 49 fixed above the casing 5 at a predetermined distance from the side wall 38.

The device 1 further includes a first drive mechanism 51 for rotating the body 4 with respect to the support 3 about the axis of rotation 32 and a second drive mechanism 52 for rotating the casing 5 with respect to the body 4 about the drive of rotation 37. Both the drive mechanism 51 and the drive mechanism 52, which are substantially of known type, are housed in the internal cavity 42 within the body 4 and may for example include respective toothed wheel and worm screw rotation systems 53, 54 (known and not illustrated in detail for simplicity).

A connection cable 55 is positioned for connection of the support 3, the body 4 and the body 5, while a connection cable 56 is positioned for connection of the support 3 and the body 4. Within these connection cables 55, 56 can be both supply and control wiring for the drive mechanisms 51, 52 and control wiring for the television camera 2 (these being of any type) which enter into the internal cavity 8 of the support 3 through the output cable 24.

The connection cables 55, 56 comprise, starting from respective terminals housed within the internal cavity 8 of the support 3, respective substantially straight end sections 57, 58, and respective deformable sections 59, 60 having a helical conformation with an axis substantially parallel to the axis of rotation 32. Each of the end sections 57, 58 passes through one of the longitudinal through holes 19, 22 of the tubular sleeve 18. The end sections 57, 58 are also at least partially embedded in respective sealing matrices 61, 62 which fill at least part of the respective longitudinal through holes 19, 20 and which form anchorages for these end sections 57, 58 to the tubular sleeve 18 and, therefore, to the support 3. It is clear however that this anchorage could be formed in a different manner from that indicated, in any known way.

The helical deformable sections 59, 60 of the connection cables 55, 56 extend out from the tubular sleeve 18 (and in particular from its longitudinal through holes 19, 20) into the internal housing 17 where they are both wound with alternate turns about the central pin 21. The deformable sections 59, 60 are plastically deformable above a predetermined stress threshold to be pre-shaped into their helical conformation of use, while they are elastically deformable to unwind from this helical conformation under a predetermined load which is less than the predetermined stress threshold of plastic deformability, and able to reassume this helical shape when the applied load is released.

The connection cable 56 includes, after its helical deformable section 60, a further end section 63, possibly branched, which however terminates within the internal cavity 27 of the body 4, to be connected to the drive mechanism 51, 52. The connection cable 55 comprises, after its helical deformable section 59, a connection section 64 which traverses the internal cavity 27 of the body 4, and a further helical deformable section 65 the axis of which is substantially parallel to the axis of rotation 37 and fitted so as to pass through the internal housing 45 carried by the body 5. The deformable section 65 also has the same characteristics of deformability as the deformable sections 59, 60 which have been previously described, being in particular plastically deformable above a predetermined stress threshold to be pre-shaped into a helix, and being in use elastically deformable to unwind from its helical shape by applied loads less than this predetermined stress threshold, and to reassume its helical shape when the applied load is released.

The connection cable 55 also includes a further end section 66, opposite the end section 57 and consecutive to the deformable section 65, having a substantially straight shape and passing through the tubular sleeve 46 to which it is fixedly anchored, for example embedded in a sealing matrix 67 which at least partially fills the interior of this tubular sleeve 46. The end section 66 of the connection cable 55 then terminates within the internal cavity 42 of the casing 5 from where, for example, the control and supply cables for the television camera 2 lead.

During construction, therefore, the deformable sections 59, 60 and 65 of the connection cables 55, 56 are pre-shaped to their helical shape thanks to their plastic deformability. In use, when the body 4 rotates with respect to the support 3 and/or with respect to the casing 5 in a first sense of rotation the deformable sections 59, 60 and/or 65 of the connection cables 55, 56 are partially unwound from their helical shape to follow this rotation. When the body 4 turns with respect to the support 3 and/or the casing 5 in the opposite sense, the deformable sections 59, 60 and/or 65 rewind recovering their initial helical shape by virtue of their elastic deformability. For this purpose, clearly, the load which is applied to the deformable sections 59, 60, 65 during relative rotation of the bodies 3, 4, 5 must be less than the plastic deformability threshold of the connection cables 55, 56.

Figure 4:
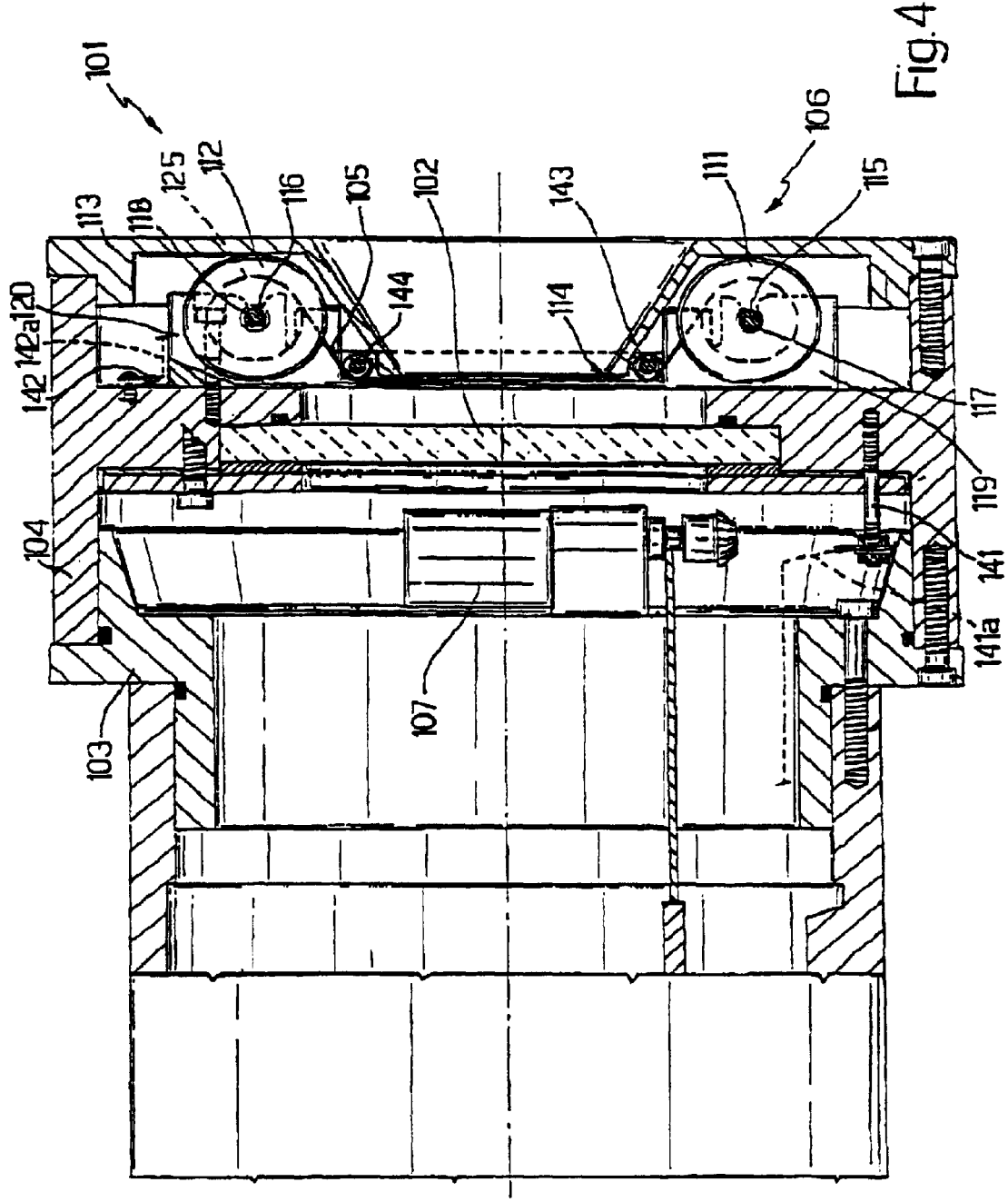
FIG. 4 is a sectioned view of a cleaning device for a window of an explosion-proof casing, in particular a casing for containing a television camera, formed according to the invention.

With reference now to FIGS. 4 and 5 the reference numeral 101 generally indicates a cleaning device for a transparent element 102 of an explosion-proof casing 103 which can be utilized as a variant in FIGS. 1, 2 and 3 for the body 5 to contain the television camera. The casing 103 is provided with a transparent element 102 on its wall 104 and is hermetically isolated from the external environment by way of the constructional arrangements described.

The device 101 comprises a transparent film 105, for example made of a polymeric material, which is moveably disposed outside the casing 103, and a transport mechanism 106 for moving the film 105 along a predetermined path tangential to the transparent element 102 to carry the film 105 in front of such transparent element 102. The transport mechanism 106 in turn comprises a motor 107 housed within the explosion proof casing 103 hermetically isolated from the external environment (in such a way that possible sparks generated by the motor 107 cannot be transmitted outside the casing 103 thereby triggering explosions) and a transmission mechanism 108 for transmitting motion from the motor 107 to the moveable film 105.

In particular, the transport mechanism 106 comprises a first drum 111 and a second drum 112 housed within a substantially annular hollow body 113, for example disposed outside the casing 103 and mechanically connected to the wall thereof in a non-movable manner (for example by way of screws) and provided with a through aperture 114 in correspondence with the transparent element of the casing 103.

The drums 111, 112 are fitted onto respective drive shafts 115, 116 which are rotatably mounted in a removal manner in respective rotation seats 117, 118. In the specific example the rotation seats 117, 118 are constituted by respective cavities formed in respective supports 119, 120 disposed within the hollow body 113, for example carried by the wall 104, within which the drive shafts 115, 116 are snap-engagable.

The film 5 is tensioned between the drums 111, 112 on which respective opposite ends of this film 105 are fixed, and covers the aperture 114 thereby preventing external contaminants from becoming deposited on the transparent element 102. In particular, a coil 125 of film 105 is wound on the drum 112 from which it can be unwound to be rewound onto the drum 111.

The transmission mechanism 108 comprises a transmission shaft 130 rotatably lodged in an associated seat 131 passing through the wall of the casing 103, and a bevel gear 132, 133 for transferring drive from the transmission shaft 130 to the drum 111, in turn comprising a first bevel gear 132 fitted to the drive shaft 115 and a second bevel gear 133 fitted to the transmission shaft 130. As illustrated in particular in FIG. 5, the transmission shaft 130 is substantially orthogonal to the drive shaft 115 for the drum 111.

Within this seat 131, passing through the wall 104, there is a sleeve 135, coupled in a fluid-type sealing manner with the seat 131 to maintain the hermetic seal of the casing 103 notwithstanding the presence of the seat 131. The transmission shaft 130 is in turn fitted rotatably within the sleeve 135 without substantial play.

Preferably, the motor 107 is disposed laterally with respect to the transparent element 102 and has its output shaft 136 substantially orthogonal to the transmission shaft 130 to which it transfers drive by way of a second bevel gear 137, 138.

Both the casing 103 and the hollow body 113 are provided with an earth (ground) connection. For example, as illustrated in FIG. 4, a first earth contact 141 extends from the wall 104 of the casing 103 and is connected to ground by known matter such as by a cable 141a, while a second earth contact 142 extends from the wall 104 to the exterior of the hollow body 113 to be connected to such body 113 from within in any known manner not illustrated for simplicity, by way of a cable 142a.

The sealed fixing of the sleeve 135 into the seat 131 is obtained by axial engagement of a shoulder 150 of the sleeve 135 against the wall 104 and a circle clip 151 fitted on the end of the sleeve 135 opposite the shoulder 150, which end is also provided with an annular seat 152 which extends within the seat 131 and is in use filled with sealing material to ensure that the explosion-proof sealing of the sleeve 135 through the wall 104.

The operation of the device 101 is as follows. When the film portion 105 of polymeric material which closes the aperture 114 and covers the transparent element 102 is dirty, the motor 107 is actuated and thanks to the transmission mechanism 108 drives the drum 111 to rotate. The drum 111 is fitted to a first end of the film 105 and therefore also causes the drum 112 to rotate. The film 105 is thus unwound from the drum 112 and, possibly with the aid of return rollers 143, 144, follows the envisaged path passing tangentially to the transparent element 102 and then winds onto the drum 111. In this way the dirty portion of the film 105 is wound onto the drum 111 and a new, clean, portion of the film 105 is brought to cover the transparent element 102 reinstating a high level of transparency.

Only when all the film 105 has been completely unwound from the drum 112 and wound onto the drum 111 must an operator replace the used film 105 with a new one, for example by directly removing the rollers 111, 112 from the respective supports 119, 120 after having opened the hollow body 113.

In the foregoing description, it can be seen that the present invention comprises a new and useful explosion-proof scanning device 1 for a monitoring apparatus 2, and a cleaning device 101 for a transparent element 102 of an explosion-proof casing 103. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A scanning device for a monitoring apparatus, the scanning device comprising:

first and second bodies movable with respect to one another;

a first rotatable coupling mechanism coupling the first and second bodies;
a first drive mechanism for rotating one of the first and second bodies with respect to the other about a first axis of rotation;
at least one first connection cable connecting between the first and second bodies, the first rotatable coupling mechanism being provided with a first housing for the at least one first connection cable to pass through, the at least one first connection cable passing through the first housing substantially along the first axis of rotation;
a casing for the monitoring apparatus, the casing including a transparent element through which the monitoring apparatus monitors;
a cleaning device for the transparent element, the cleaning device comprising a transparent film moveably disposed outside the casing and a transport mechanism for moving the film along a predetermined path tangential to the transparent element to carry the film in front of the transparent element.

2. The scanning device of claim 1 wherein the first connection cable is sealed within the first and second bodies and the first housing of the first coupling mechanism.

3. The scanning device of claim 1 in combination with the monitoring apparatus, wherein the monitoring apparatus comprises a surveillance television camera.

4. A scanning device in combination with a monitoring apparatus in an explosive environment, the scanning device comprising:
first and second bodies movable with respect to one another;
a first rotatable coupling mechanism coupling the first and second bodies;
a first drive mechanism for rotating one of the first and second bodies with respect to the other about a first axis of rotation,
at least one first connection cable connecting between the first and second bodies, the first rotatable coupling mechanism being provided with a first housing for the at least one first connection cable to pass through, the at least one first connection cable passing through the first housing substantially along the first axis of rotation,
the second body and the monitoring apparatus movable with respect to one another, the scanning device further comprising a second rotatable coupling mechanism coupling the second body and the monitoring apparatus;
a second drive mechanism for rotating one of the second body and the monitoring apparatus with respect to the other about a second axis of rotation; and
at least one second connection cable connecting between the second body and the monitoring apparatus, the second rotatable coupling mechanism being provided with a second housing for the at least one second connection cable to pass through, the at least one second connection cable passing through the second housing substantially along the second axis of rotation.

5. The scanning device of claim 4 wherein the second connection cable is sealed within the second body and the monitoring apparatus and the second housing of the second coupling mechanism.

6. The scanning device of claim 4 wherein the first connection cable includes at least a portion of the second connection cable.

7. The scanning device of claim 4 wherein the first axis and second axis are generally orthogonal.

8. The scanning device of claim 4 wherein the second connection cable is pre-shaped to a deformable helical shape, wherein the helical shape winds and unwinds according to rotation of the monitoring apparatus with respect to the second body.

9. A scanning device for a monitoring apparatus in an explosive environment, the scanning device comprising:
first and second bodies movable with respect to one another;
a first rotatable coupling mechanism coupling the first and second bodies;
a first drive mechanism for rotating one of the first and second bodies with respect to the other about a first axis of rotation; and
at least one first connection cable connecting between the first and second bodies, the first rotatable coupling mechanism being provided with a first housing for the at least one first connection cable to pass through, the at least one first connection cable passing through the first housing substantially along the first axis of rotation;
wherein the first connection cable is pre-shaped to a deformable helical shape, wherein the helical shape winds and unwinds according to rotation of the second body with respect to the first body.

10. A scanning device in combination with a monitoring device in an explosive environment, the scanning device comprising:
first and second bodies movable with respect to one another;
a first rotatable coupling mechanism coupling the first and second bodies;
a first drive mechanism for rotating one of the first and second bodies with respect to the other about a first axis of rotation; and
at least one first connection cable connecting between the first and second bodies, the first rotatable coupling mechanism being provided with a first housing for the at least one first connection cable to pass through, the at least one first connection cable passing through the first housing substantially along the first axis of rotation;
a casing within which the monitoring device resides, the casing including a transparent element through which the monitoring device monitors, and a cleaning device for the transparent element;
wherein the cleaning device comprises a transparent film moveably disposed outside the casing, and a transport mechanism for moving the film along a predetermined path tangential to the transparent element to carry the film in front of the transparent element.

11. The scanning device of claim 10 wherein the transport mechanism comprises a motor housed and hermetically isolated within the casing and a transmission mechanism for transmitting motion from the motor to the film.

12. The scanning device of claim 11 wherein the film is unwound from a first drum and wound onto a second drum by the transmission mechanism, the first and second drums being outside the casing.

13. The scanning device of claim 12 wherein the transmission mechanism comprises a transmission shaft passing through a wall of the casing.

14. A scanning device for a monitoring apparatus, the scanning device comprising:

first and second bodies movable with respect to one another;

a first rotatable coupling mechanism coupling the first and second bodies;

a first drive mechanism for rotating one of the first and second bodies with respect to the other about a first axis of rotation; and at least one first connection cable connecting between the first and second bodies, the first rotatable coupling mechanism being provided with a first housing for the at least one first connection cable to pass through, the at least one first connection cable passing through the first housing substantially along the first axis of rotation;

wherein the first connection cable is pre-shaped to a deformable helical shape and winds and unwinds according to rotation of the second body with respect to the first body.

* * * * *